US010118561B2

(12) United States Patent
James-Moore

(10) Patent No.: US 10,118,561 B2
(45) Date of Patent: Nov. 6, 2018

(54) SIGNAGE STORAGE SYSTEM

(71) Applicant: Jean Ann James-Moore, Ramona, CA (US)

(72) Inventor: Jean Ann James-Moore, Ramona, CA (US)

( * ) Notice: Subject to any disclaimer, the term of this patent is extended or adjusted under 35 U.S.C. 154(b) by 0 days.

(21) Appl. No.: 15/434,467

(22) Filed: Feb. 16, 2017

(65) Prior Publication Data

US 2018/0229662 A1    Aug. 16, 2018

(51) Int. Cl.
| | | |
|---|---|---|
| *B60R 7/02* | (2006.01) | |
| *B60R 5/04* | (2006.01) | |
| *B60R 7/08* | (2006.01) | |
| *A47B 47/00* | (2006.01) | |
| *B60R 5/00* | (2006.01) | |

(52) U.S. Cl.
CPC .............. *B60R 7/08* (2013.01); *A47B 47/00* (2013.01); *B60R 5/00* (2013.01); *B60R 5/04* (2013.01); *B60R 7/02* (2013.01)

(58) Field of Classification Search
CPC ................................. B60R 7/02; B60R 5/04
USPC ....... 224/539, 542, 404, 680, 679, 915, 920, 224/275, 274, 411, 401; D12/424, 425, D12/414.1, 423; 296/37.6, 37.1, 24.44; 220/533; 211/184; 312/351
See application file for complete search history.

(56) References Cited

U.S. PATENT DOCUMENTS

| | | | | |
|---|---|---|---|---|
| 584,167 | A * | 6/1897 | Shanklin | B60R 7/14 211/184 |
| 1,560,493 | A * | 11/1925 | Steinberg | B43M 99/008 211/50 |
| 1,833,081 | A * | 11/1931 | Kilmer | B65D 25/06 217/36 |
| 2,112,498 | A * | 3/1938 | Lax | A47B 45/00 108/61 |
| 2,740,534 | A * | 4/1956 | Torrent | B60R 5/003 211/182 |
| 3,517,978 | A | 6/1970 | Hudson | |
| D254,887 | S * | 5/1980 | Jorda-Segui | D6/675.1 |
| 4,236,768 | A * | 12/1980 | Morrone | A47B 81/067 211/40 |
| 4,463,684 | A * | 8/1984 | Klungle | A47B 43/00 108/91 |
| 4,510,872 | A * | 4/1985 | Parry | B43M 99/00 108/25 |
| 4,512,503 | A * | 4/1985 | Gioso | B60R 7/043 206/216 |
| 4,795,067 | A * | 1/1989 | Hamilton | B60R 7/12 224/543 |
| 4,944,544 | A * | 7/1990 | Dick | B60R 7/02 224/542 |
| D312,604 | S | 12/1990 | Barnes et al. | |
| 5,025,964 | A | 6/1991 | Phirippidis | |
| 5,054,864 | A * | 10/1991 | Cesena | B60R 11/06 312/31 |
| 5,167,433 | A * | 12/1992 | Ryan | B60R 7/02 220/533 |

(Continued)

*Primary Examiner* — Justin Larson

(57) ABSTRACT

A signage storage system for storing signs in a vehicle includes a vehicle that has a trunk. A storage unit is provided and the storage unit is removably positioned in the trunk. The storage unit has a plurality of removable shelves and each of the removable shelves contains an associated one of a plurality of signs. In this way the signs are inhibited from freely moving about in the trunk.

11 Claims, 7 Drawing Sheets

(56) References Cited

U.S. PATENT DOCUMENTS

| | | | | |
|---|---|---|---|---|
| D333,579 S | * | 3/1993 | Wells | D6/407 |
| 5,215,205 A | * | 6/1993 | Behlman | B60R 7/02 220/4.31 |
| 5,232,259 A | * | 8/1993 | Booker | B60R 11/06 224/404 |
| 5,263,578 A | * | 11/1993 | Narvey | B62B 3/1428 206/232 |
| 5,405,196 A | * | 4/1995 | Shoup | A47B 57/42 248/488 |
| 5,427,446 A | * | 6/1995 | Glomski | A47B 81/068 206/387.15 |
| 5,469,999 A | * | 11/1995 | Phirippidis | B60R 5/04 220/23.4 |
| 5,505,358 A | | 4/1996 | Haase | |
| D376,578 S | * | 12/1996 | Redford | D12/424 |
| 5,603,441 A | * | 2/1997 | Easter | A45F 3/00 224/153 |
| 5,713,502 A | * | 2/1998 | Dixon | B60R 7/02 190/103 |
| 5,819,996 A | | 10/1998 | Koons, Jr. | |
| 5,979,725 A | | 11/1999 | Lehrman | |
| 5,988,476 A | * | 11/1999 | Olerio | A47B 57/10 224/630 |
| 6,030,059 A | * | 2/2000 | Stravitz | A47B 63/00 206/387.14 |
| D426,512 S | * | 6/2000 | Ciuba | D12/425 |
| 6,082,804 A | * | 7/2000 | Schlachter | B60R 9/00 224/281 |
| 6,095,388 A | * | 8/2000 | Neville, Sr. | B60R 7/12 211/62 |
| 6,149,040 A | | 11/2000 | Walker | |
| 6,203,878 B1 | * | 3/2001 | Davis | A47B 97/04 224/270 |
| D446,005 S | * | 8/2001 | Be Lue | D3/11 |
| 6,386,412 B1 | * | 5/2002 | Konechne | B60R 7/04 224/275 |
| 6,386,610 B1 | * | 5/2002 | Butzke | B60R 11/06 211/162 |
| 6,425,510 B1 | * | 7/2002 | King | B60R 9/065 224/401 |
| 6,435,390 B1 | * | 8/2002 | Abramowicz | A01K 97/06 224/629 |
| D462,171 S | * | 9/2002 | Elabour | D12/423 |
| 6,607,241 B2 | * | 8/2003 | Johnston | B60N 2/20 297/163 |
| 6,641,192 B2 | * | 11/2003 | Eschenfelder | A47B 87/02 224/274 |
| 6,935,670 B2 | * | 8/2005 | Bright | B60P 3/075 224/404 |
| D509,178 S | * | 9/2005 | Panasewicz | D12/425 |
| 7,051,471 B1 | * | 5/2006 | Ausborne, Jr. | A01K 97/06 206/315.11 |
| RE40,267 E | * | 4/2008 | Mehmen | E05B 65/46 292/128 |
| 7,784,885 B2 | * | 8/2010 | Steiger | B60P 3/14 108/106 |
| 7,794,003 B2 | * | 9/2010 | Crandall | B60R 9/00 224/403 |
| 8,281,967 B2 | * | 10/2012 | Evans | B60R 9/00 224/404 |
| 8,459,489 B2 | | 6/2013 | Potts et al. | |
| 9,010,830 B2 | * | 4/2015 | Hanley | B60R 7/08 296/24.44 |
| 9,834,149 B2 | * | 12/2017 | Hanley | B60R 7/08 |
| 2005/0173483 A1 | * | 8/2005 | Ravikumar | B60R 7/12 224/483 |
| 2006/0091689 A1 | * | 5/2006 | Wilding | B60R 9/00 296/37.6 |
| 2007/0131568 A1 | * | 6/2007 | Georgia | A45C 13/02 206/223 |
| 2009/0206622 A1 | | 8/2009 | Craft | |

* cited by examiner

SIGNAGE STORAGE SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to storage devices and more particularly pertains to a new storage device for storing signs in a vehicle.

BRIEF SUMMARY OF THE INVENTION

An embodiment of the disclosure meets the needs presented above by generally comprising a vehicle that has a trunk. A storage unit is provided and the storage unit is removably positioned in the trunk. The storage unit has a plurality of removable shelves and each of the removable shelves contains an associated one of a plurality of signs. In this way the signs are inhibited from freely moving about in the trunk.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
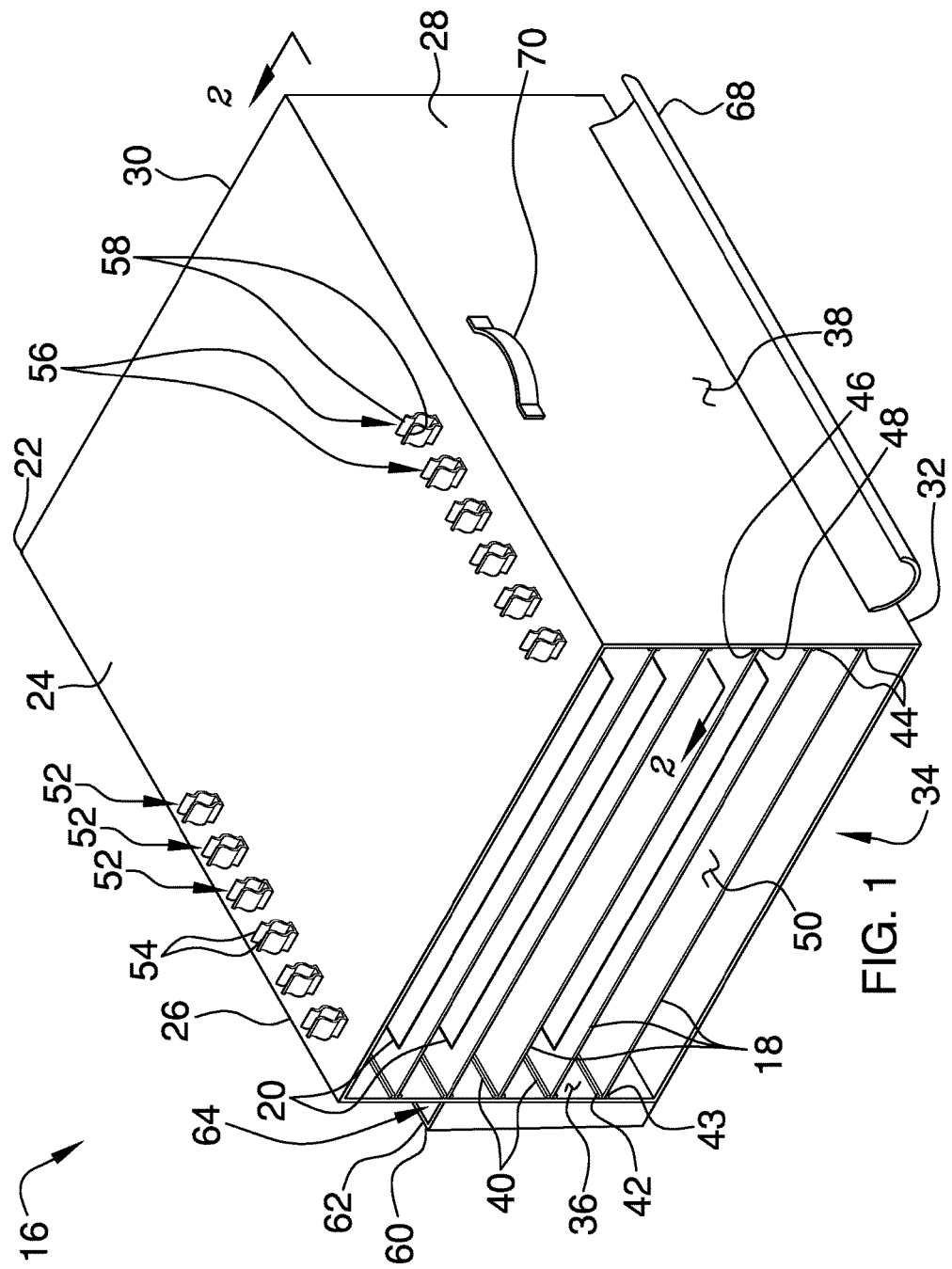
FIG. 1 is a perspective view of a signage storage system according to an embodiment of the disclosure.
Figure 2:
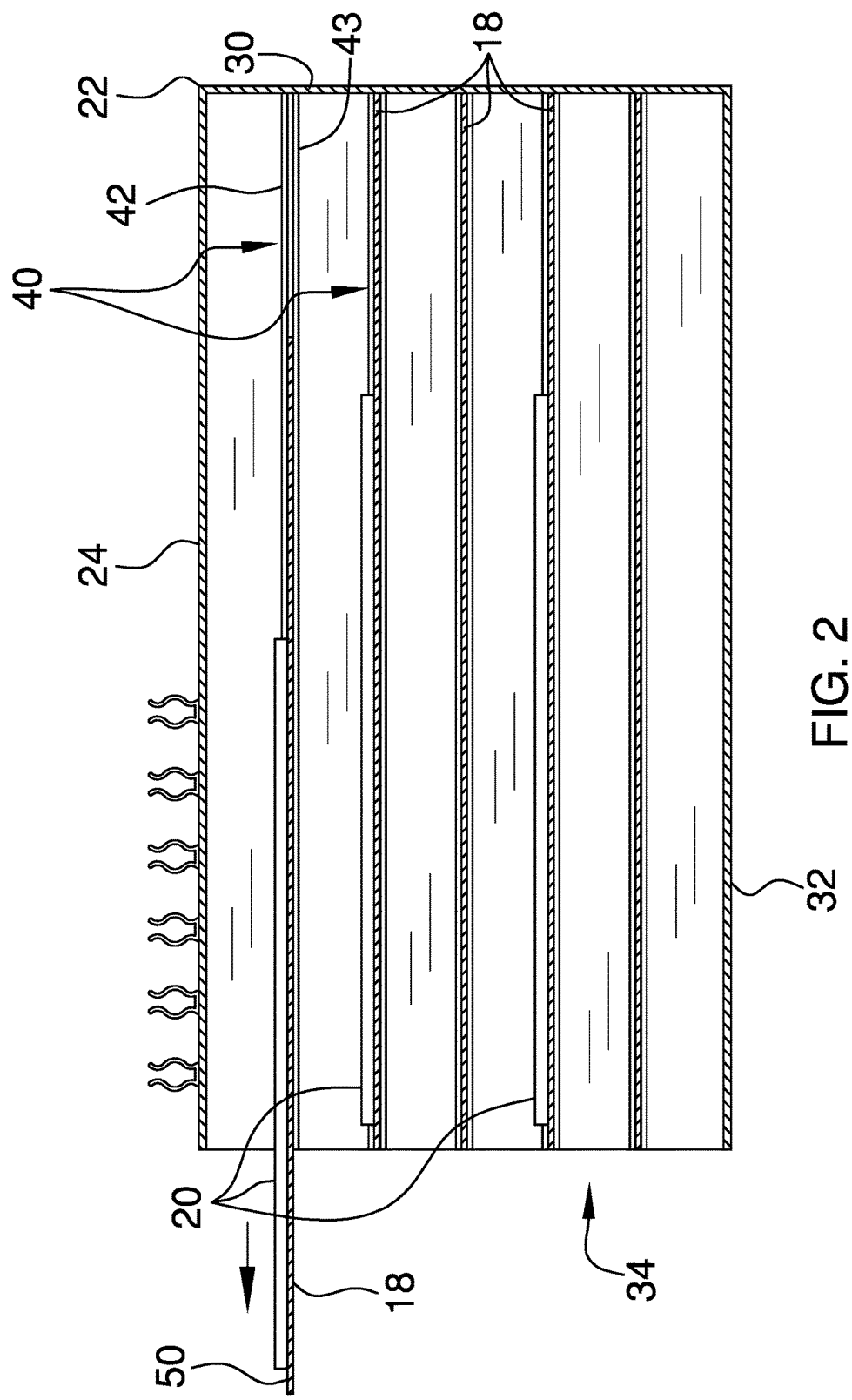
FIG. 2 is a cross sectional view taken along line 2-2 of FIG. 1 of an embodiment of the disclosure.

With reference now to the drawings, and in particular to FIGS. 1 through 7 thereof, a new storage device embodying the principles and concepts of an embodiment of the disclosure and generally designated by the reference numeral 10 will be described.

As best illustrated in FIGS. 1 through 7, the signage storage system 10 generally comprises a vehicle 12 that has a trunk 14. The vehicle 12 may be a car, a sport utility vehicle or any other type of passenger vehicle. A storage unit 16 is provided and the storage unit 16 is removably positioned in the trunk 14. The storage unit 16 has a plurality of removable shelves 18 to contain an associated one of a plurality of signs 20. In this way the signs 20 are inhibited from freely moving about in the trunk 14. The signs 20 may be, but not be limited to, realtor signs or other signs that are temporarily displayed at a property. The storage unit 16 may be employed by a realtor when the realtor is showing homes.

The storage unit 16 comprises a box 22 that has a top wall 24, a first lateral wall 26, a second lateral wall 28, a back wall 30, a bottom wall 32 and a front side 34. The front side 34 is open to access an interior of the box 22 and the box 22 is removably positioned in the trunk 14. The box 22 has an inside surface 36 and an outside surface 38. The box 22 may have a width ranging between 63.0 cm and 88.0 cm, a depth ranging between 76.0 cm and 90.0 cm and a height ranging between 45.0 cm and 50.0 cm.

A set of first tracks 40 is provided and each of the first tracks 40 is coupled to the inside surface 36 corresponding to the first lateral wall 26. Each of the first tracks 40 is horizontally oriented. Moreover, the set of first tracks 40 is spaced apart from each other and is distributed on the first lateral wall 26. Each of the first tracks 40 extends between the front side 34 and the back wall 30. Each of the first tracks 40 includes a top rail 42 that is spaced from a bottom rail 43.

A set of second tracks 44 is provided and each of the second tracks 44 is coupled to the inside surface 36 corresponding to the second lateral wall 28. Each of the second tracks 44 is horizontally oriented. Additionally, the set of second tracks 44 is spaced apart from each other and is distributed on the second lateral wall 28. Each of the second tracks 44 is aligned with an associated one of the first tracks 40 and each of the second tracks 44 extends between the front side 34 and the back wall 30. Each of the second tracks 44 includes a top rail 46 that is spaced from a bottom rail 48.

Each of the shelves 18 slidably engages an associated pair of the first tracks 40 and the second tracks 44. In this way each of the shelves 18 is removably retained in the box 22 and each of the shelves 18 is selectively inserted into the front side 34 of the box 22. Each of the shelves 18 is positioned between the top rail and the bottom rail corresponding to the associated pair of first and second tracks 44. Each of the shelves 18 has a top surface 50 and an associated one of the signs 20 is on the top surface 50 of the corresponding shelf 18 to store the associated sign. The shelves 18 may be spaced apart from each other a distance ranging between 5.0 cm and 8.0 cm.

A plurality of first grips 52 is provided and each of the first grips 52 is coupled to the outside surface 38 corresponding to the top wall 24. Each of the first grips 52 is spaced apart from each other and is distributed between the front side 34 and the back wall 30. Moreover, each of the first grips 52 is spaced from the first lateral wall 26. Each of the first grips 52 includes a pair of members 54 extending upwardly from the box 22. The members 54 are biased toward each other to frictionally engage an object to retain the object on the top wall 24.

A plurality of second grips 56 is provided and each of the second grips 56 is coupled to the outside surface 38 corresponding to the top wall 24. Each of the second grips 56 is spaced apart from each other and is distributed between the front side 34 and the back wall 30. Additionally, each of the second grips 56 is spaced from the second lateral wall 28 and each of the second grips 56 is aligned with an associated one of the first grips 52. Each of the second grips 56 includes a pair of members 58 extending upwardly from the box 22. The members 58 corresponding to each of the second grips 56 are biased toward each other to frictionally engage the object to retain the object on the top wall 24. The object retained in the first grips 52 and the second grips 56 may be a flag that is deployed in conjunction with one of the signs 20.

A pocket 60 is provided and the pocket 60 is coupled to the outside surface 38 of the box 22. The pocket 60 has a first wall 62 that is spaced from the outside surface 38 to define a storage space 64. Additionally, the pocket 60 has an upper side 66 and the upper side 66 is open to access the storage space 64. The upper side 66 insertably receives an object for storage and the object may be a file folder or the like. The pocket 60 may be positioned on the first lateral wall 26 of the box 22.

A saddle 68 is coupled to the outside surface 38 of the box 22 and the saddle 68 is horizontally oriented on the box 22. The saddle 68 extends between the front side 34 and the back wall 30. Moreover, the saddle 68 is concavely arcuate to receive a tubular object for storage. The tubular object may be architectural drawings or the like. The saddle 68 may be positioned on the second lateral wall 28 of the box 22.

A pair of handles 70 is provided and each of the handles 70 is coupled to the outside surface 38 corresponding to an associated one of the first lateral wall 26 and the second lateral wall 28. Each of the handles 70 is selectively gripped for transporting the box 22. Each of the handles 70 may comprise a strap with a first end and a second end. Each of the first end and the second end may be coupled to the box 22. In this way the strap may form an arch with respect to the box 22 for gripping. Additionally, the strap corresponding to each of the handles 70 may be comprised of a deformable material such as nylon or the like.

Figure 3:
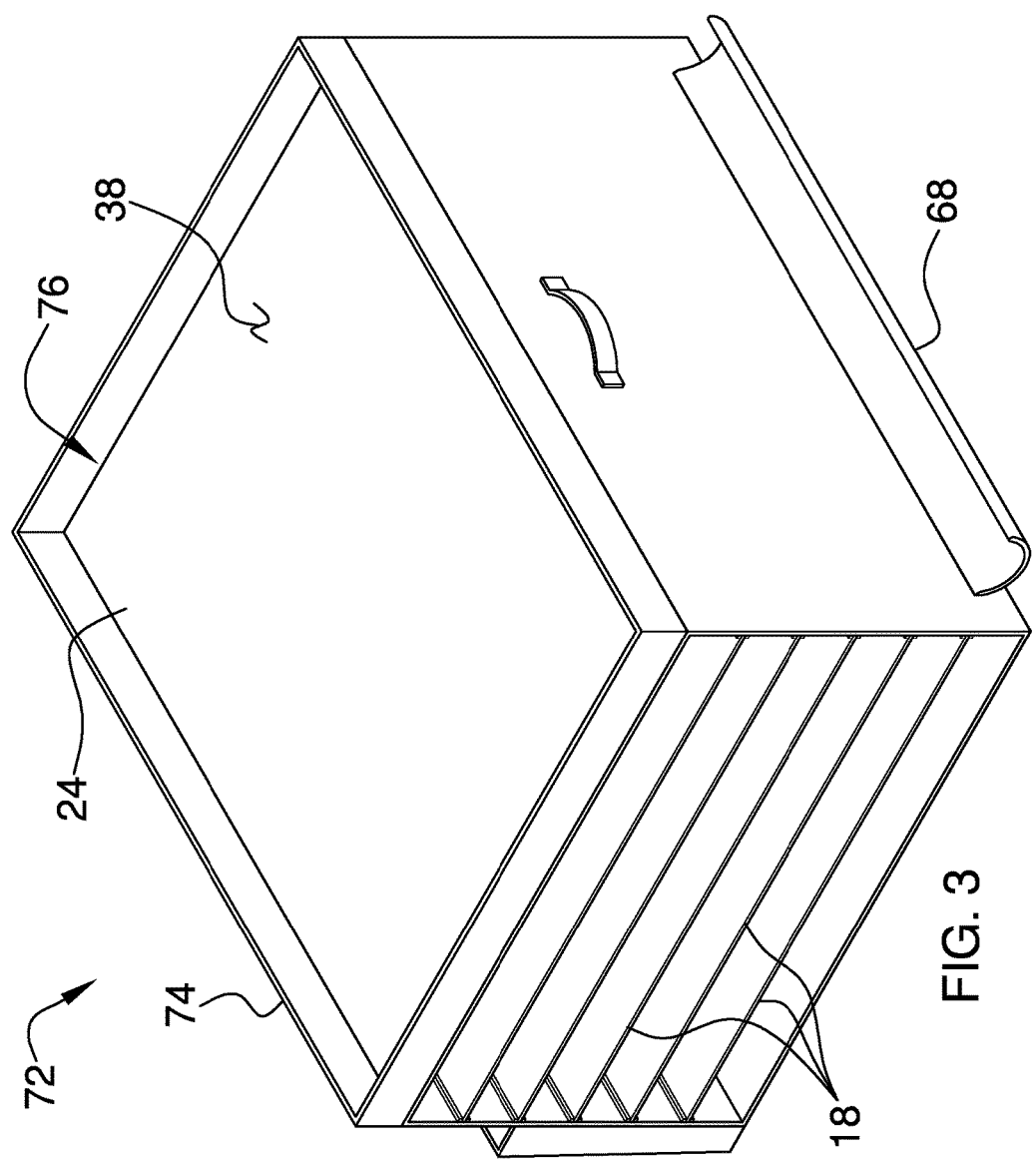
FIG. 3 is a perspective view of an alternative embodiment of the disclosure.
Figure 4:
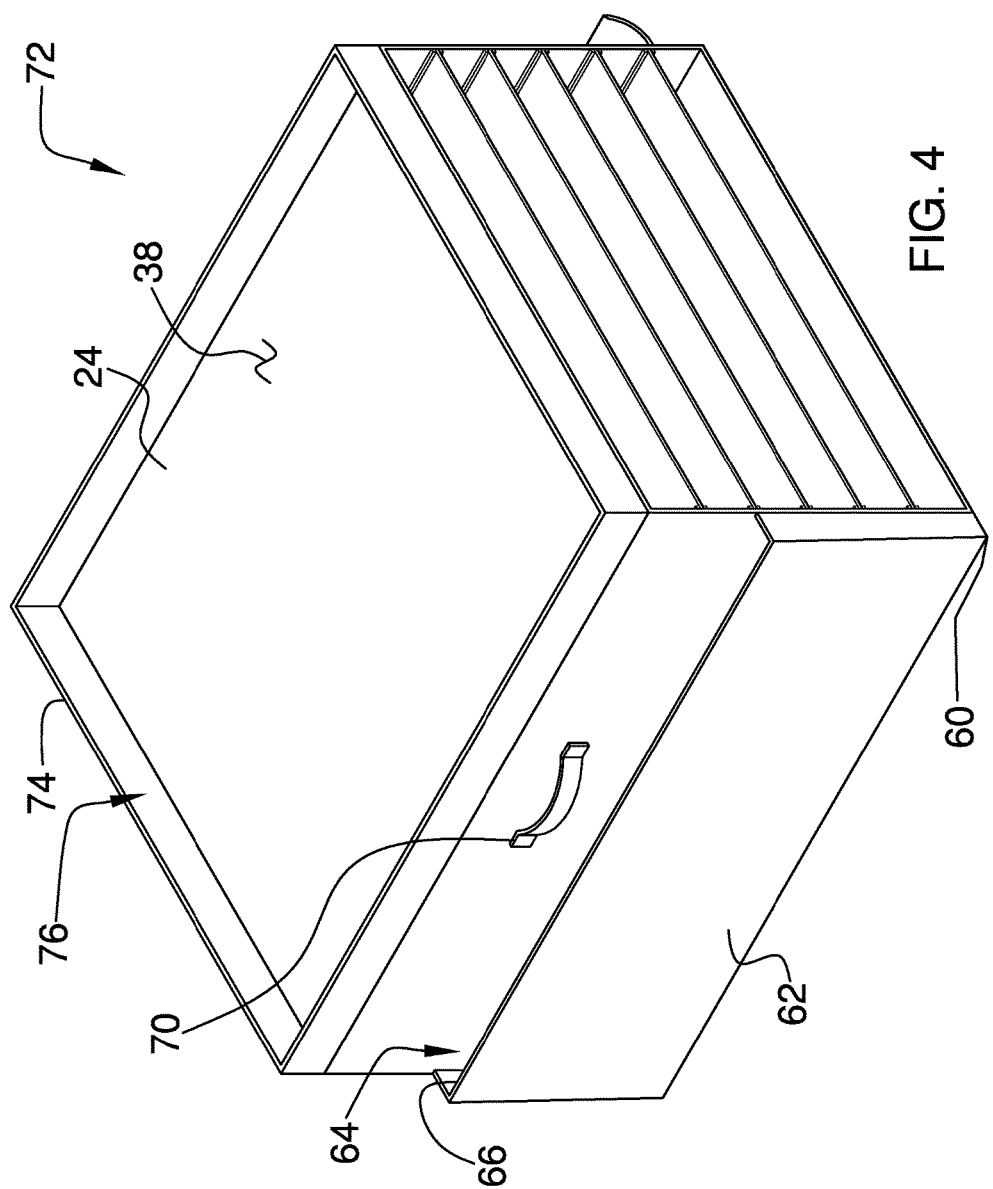
FIG. 4 is a right side perspective view of an alternative embodiment of the disclosure.

In an alternative embodiment 72 as shown in FIGS. 3 and 4, a lip 74 may be coupled to and extend upwardly from the outside surface 38 corresponding to the top wall 24 of the box 22. The lip 74 may be coextensive with a perimeter of the top wall 24 to define a storage area 76 on the top wall 24.

The storage area 76 may selectively contain selected objects and the lip 74 may inhibit the selected objects from sliding off of the top wall 24.

Figure 5:
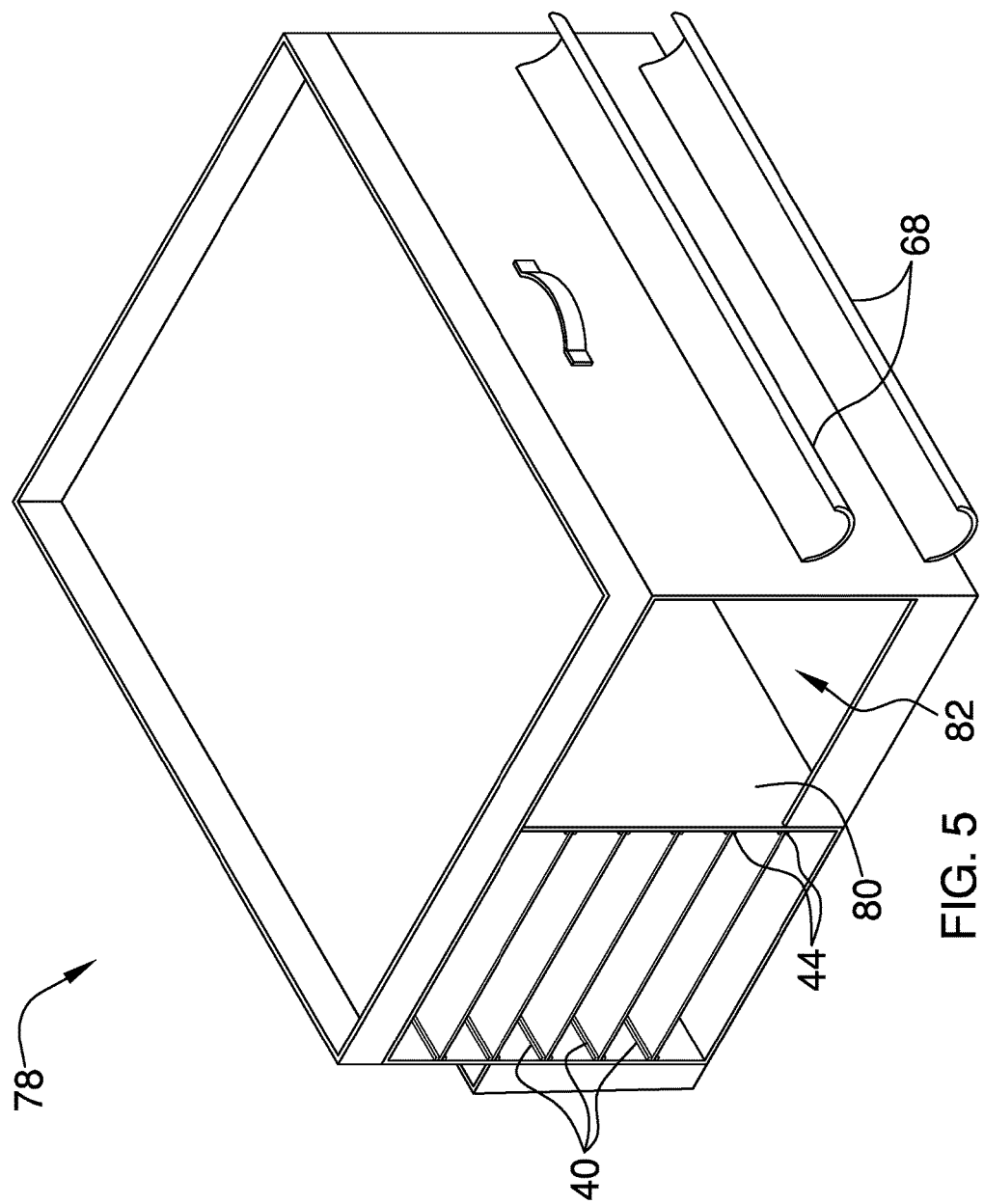
FIG. 5 is a front perspective view of an alternative embodiment of the disclosure.

In an alternative embodiment 78 as shown in FIG. 5, a pair of the saddles 68 may be provided and the saddles 68 may be spaced apart from each other on the second lateral wall 28 of the box 22. A divider 80 may be provided and the divider 80 may extend between the bottom wall 32 and the top wall 24 of the box 22. Moreover, the divider 80 may be centrally positioned between the first lateral wall 26 and the second lateral wall 28. Each of the second tracks 44 may be positioned on the divider 80 and the divider 80 may define a compartment 82 extending between the divider 80 and the second lateral wall 28 of the box 22.

Figure 6:
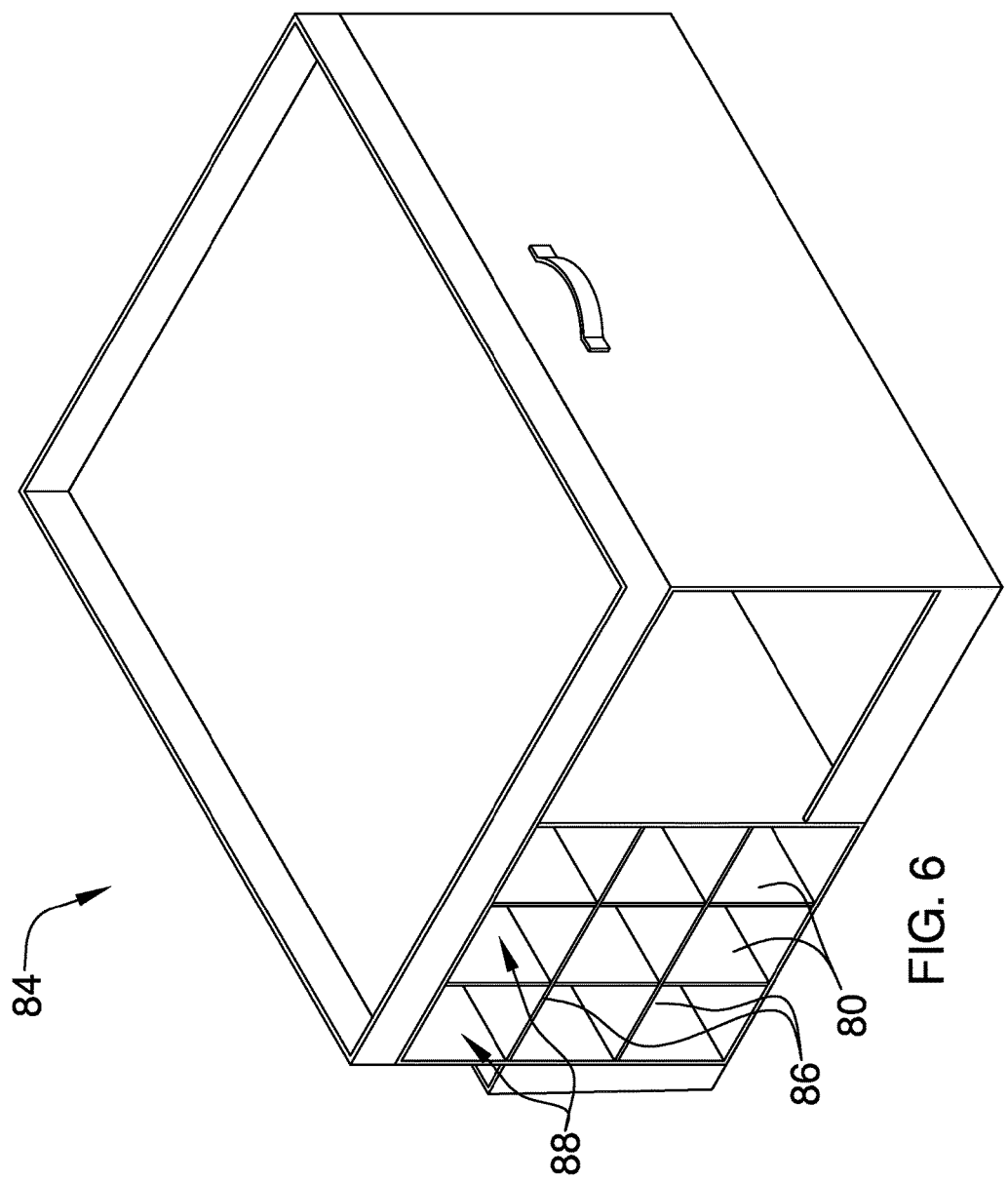
FIG. 6 is a left side perspective view of an alternative embodiment of the disclosure.
Figure 7:
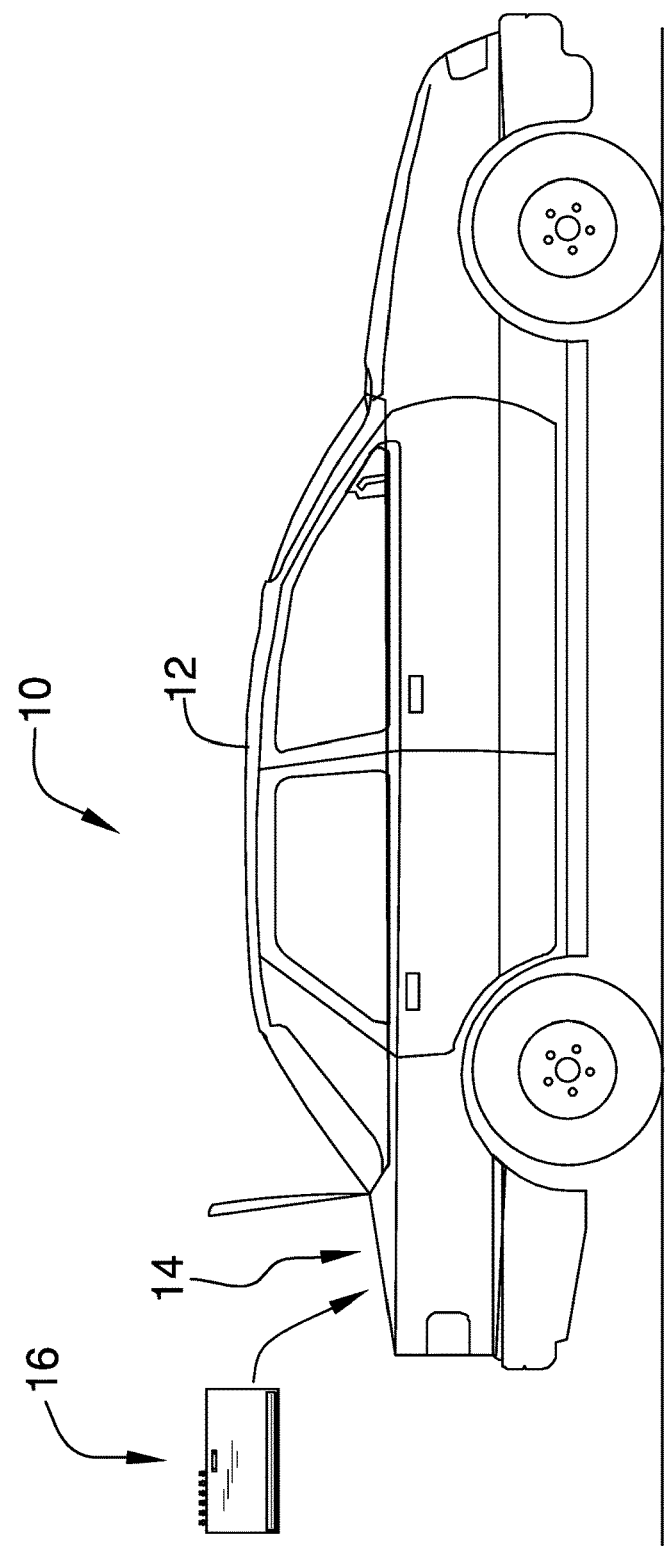
FIG. 7 is a perspective in-use view of an embodiment of the disclosure.

In an alternative embodiment 84 as shown in FIG. 6, a plurality of the dividers 80 may be provided. Each of the dividers 80 may be spaced apart from each other and distributed between the first lateral wall 26 of the box 22 and the compartment 82. A plurality of panels 86 may be provided and each of the panels 86 may extend between the first lateral wall 26 of the box 22 and each of the dividers 80. In this way a plurality of storage slots 88 may be defined between the plurality of panels 86 and the plurality of dividers 80. Moreover, the saddle 68 may be absent from the second lateral wall 28 of the box 22.

In use, the storage unit 16 is positioned in the trunk 14 of the vehicle 12 having the front side 34 being accessible from outside the trunk 14. Each of the signs 20 is positioned on a selected one of the shelves 18. In this way the signs 20 are organized and are inhibited from sliding freely in the trunk 14 when the vehicle 12 is driven. Each of the first 52 and second 56 grips receives an associated one of the objects to inhibit each of the objects from sliding freely in the trunk 14 when the vehicle 12 is driven. The tubular object is placed on the saddle 68 and the file folders are placed in the pocket 60. The storage unit 16 is selectively removed from the trunk 14 at any time.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

The invention claimed is:
1. A signage storage system comprising:
 a vehicle having a trunk; and
 a storage unit being removably positioned in said trunk, said storage unit having a plurality of removable shelves wherein each of said removable shelves is configured to contain an associated one of a plurality of signs thereby inhibiting the signs from freely moving about in said trunk, said storage unit comprising
  a box having a top wall, a first lateral wall, a second lateral wall, a back wall and a front side, said front side being open to access an interior of said box, said box being removably positioned in said trunk, said box having an inside surface and an outside surface, and
  a saddle being coupled to said outside surface of said box, said saddle being horizontally oriented on said box, said saddle extending between said front side and said back wall, said saddle being concavely arcuate wherein said saddle is configured to receive a tubular object for storage, said saddle having open ends being inset from respective edges of said front side and said back wall of said box.

2. The system according to claim 1, further comprising a pocket being coupled to said outside surface of said box, said pocket having a first wall being spaced from said outer surface to define a storage space, said pocket having an upper side, said upper side being open to access said storage space wherein said upper side is configured to insertably receive an object for storage.

3. The system according to claim 1, further comprising a pair of handles, each of said handles being coupled to said outside surface corresponding to an associated one of said first lateral wall and said second lateral wall wherein each of said handles is configured to be gripped for transporting said box.

4. The system according to claim 1, further comprising a set of first tracks, each of said first tracks being coupled to said inner surface corresponding to said first lateral side, each of said first tracks being horizontally oriented, said set of first tracks being spaced apart from each other and being distributed on said first lateral side, each of said first tracks extending between said front side and said back wall.

5. The system according to claim 4, further comprising a set of second tracks, each of said second tracks being coupled to said inner surface corresponding to said second lateral side, each of said second tracks being horizontally oriented, said set of second tracks being spaced apart from each other and being distributed on said second lateral side, each of said second tracks being aligned with an associated one of said first tracks, each of said second tracks extending between said front side and said back wall.

6. The system according to claim 5, wherein each of said shelves slidably engages an associated pair of said first tracks and said second tracks such that each of said shelves is removably retained in said box, each of said shelves being selectively inserted into said front side of said box, each of said shelves having a top surface, said top surface corresponding to each of said shelves being configured to have an associated one of the signs positioned thereon to store the associated sign.

7. The system according to claim 1, further comprising a plurality of first grips, each of said first grips being coupled to said outside surface corresponding to said top wall, each of said first grips being spaced apart from each other and being distributed between said front side and said back wall, each of said first grips being spaced from said first lateral side.

8. The system according to claim 7, wherein each of said first grips includes a pair of members extending upwardly from said box, said members being biased toward each other wherein said members corresponding to each of said first grips is configured to frictionally engage an object to retain the object on said top wall.

9. The system according to claim 7, further comprising a plurality of second grips, each of said second grips being coupled to said outside surface corresponding to said top wall, each of said second grips being spaced apart from each other and being distributed between said front side and said back wall, each of said second grips being spaced from said second lateral side, each of said second grips being aligned with an associated one of said first grips.

10. The system according to claim 9, wherein each of said second grips includes a pair of members extending upwardly from said box, said members corresponding to each of said second grips being biased toward each other wherein each of said members corresponding to each of said second grips is configured to frictionally engage the object to retain the object on said top wall.

11. A signage storage system comprising:
  a vehicle having a trunk; and
  a storage unit being removably positioned in said trunk, said storage unit having a plurality of removable shelves wherein each of said removable shelves is configured to contain an associated one of a plurality of signs thereby inhibiting the signs from freely moving about in said trunk, said storage unit comprising:
    a box having a top wall, a first lateral wall, a second lateral wall, a back wall and a front side, said front side being open to access an interior of said box, said box being removably positioned in said trunk, said box having an inside surface and an outside surface,
    a set of first tracks, each of said first tracks being coupled to said inner surface corresponding to said first lateral side, each of said first tracks being horizontally oriented, said set of first tracks being spaced apart from each other and being distributed on said first lateral side, each of said first tracks extending between said front side and said back wall,
    a set of second tracks, each of said second tracks being coupled to said inner surface corresponding to said second lateral side, each of said second tracks being horizontally oriented, said set of second tracks being spaced apart from each other and being distributed on said second lateral side, each of said second tracks being aligned with an associated one of said first tracks, each of said second tracks extending between said front side and said back wall,
    each of said shelves slidably engaging an associated pair of said first tracks and said second tracks such that each of said shelves is removably retained in said box, each of said shelves being selectively inserted into said front side of said box, each of said shelves having a top surface, said top surface corresponding to each of said shelves being configured to have an associated one of the signs positioned thereon to store the associated sign,
    a plurality of first grips, each of said first grips being coupled to said outside surface corresponding to said top wall, each of said first grips being spaced apart from each other and being distributed between said front side and said back wall, each of said first grips being spaced from said first lateral side, each of said first grips including a pair of members extending upwardly from said box, said members being biased toward each other wherein said members corresponding to each of said first grips is configured to frictionally engage an object to retain the object on said top wall,
    a plurality of second grips, each of said second grips being coupled to said outside surface corresponding to said top wall, each of said second grips being spaced apart from each other and being distributed between said front side and said back wall, each of said second grips being spaced from said second lateral side, each of said second grips being aligned with an associated one of said first grips, each of said second grips including a pair of members extending upwardly from said box, said members corresponding to each of said second grips being biased toward each other wherein each of said members corresponding to each of said second grips is configured to frictionally engage the object to retain the object on said top wall, a pocket being coupled to said outside surface of said box, said pocket having a first wall being spaced from said outer surface to define a storage space, said pocket having an upper side, said upper side being open to access said storage space wherein said upper side is configured to insertably receive an object for storage, a saddle being coupled to said outside surface of said box, said saddle being horizontally oriented on said box, said saddle extending between said front side and said back wall, said saddle being concavely arcuate wherein said saddle is configured to receive a tubular object for storage, said saddle having open ends being inset from respective edges of said front side and said back wall of said box, and a pair of handles, each of said handles being coupled to said outside surface corresponding to an associated one of said first lateral wall and said second lateral wall wherein each of said handles is configured to be gripped for transporting said box.

* * * * *